Oct. 20, 1931.   J. K. DIAMOND   1,827,783
BELT AND COUPLING THEREFOR
Filed Jan. 19, 1931   2 Sheets-Sheet 1
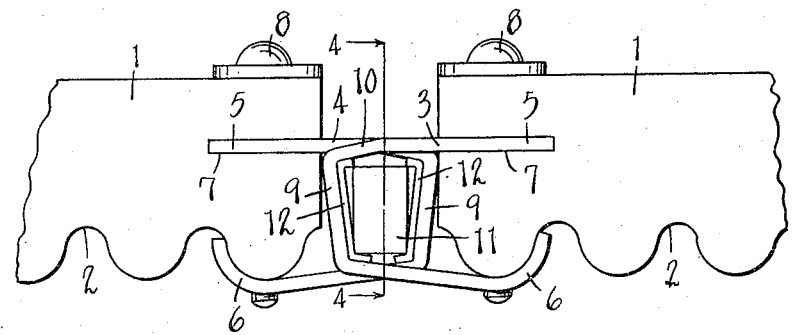
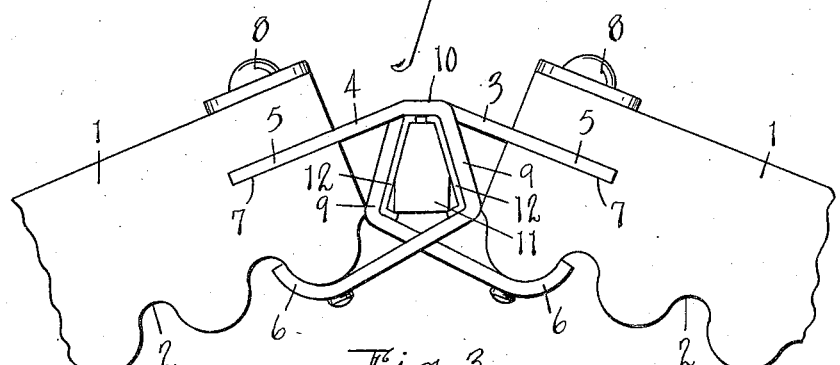
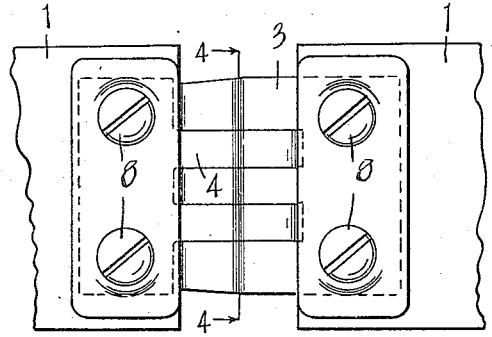
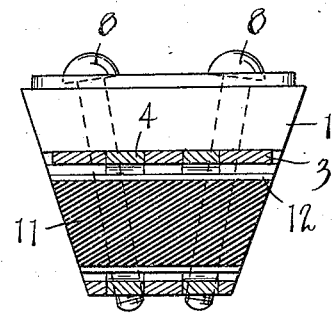
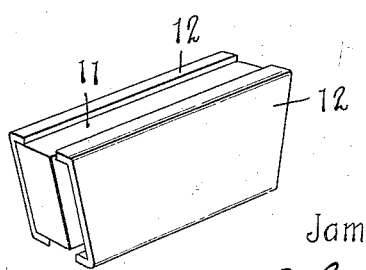
INVENTOR
James K. Diamond
BY
ATTORNEYS Oct. 20, 1931.  J. K. DIAMOND  1,827,783

BELT AND COUPLING THEREFOR

Filed Jan. 19, 1931  2 Sheets-Sheet 2

INVENTOR
James K. Diamond
BY
Chappell Earl
ATTORNEYS

Patented Oct. 20, 1931

1,827,783

UNITED STATES PATENT OFFICE

JAMES K. DIAMOND, OF GRAND RAPIDS, MICHIGAN, ASSIGNOR TO CLIPPER BELT LACER COMPANY, OF GRAND RAPIDS, MICHIGAN, A CORPORATION OF MICHIGAN

BELT AND COUPLING THEREFOR

Application filed January 19, 1931. Serial No. 509,588.

The main objects of this invention are:

First, to provide a coupling for belts of tapered or V cross section which permits the coupled portion of the belt to conform to pulleys of relatively small diameter and one in which the coupling pin constitutes a driving or pulley engaging element.

Second, to provide a belt coupling in which the wear upon the parts is minimized, there being substantially no frictional action on the pin.

Third, to provide a belt coupling which is well adapted for use in belts designed for driving heavy loads and also light loads.

Objects pertaining to details and economies of my invention will definitely appear from the description to follow. The invention is defined in the claims.

A structure embodying the features of my invention is clearly illustrated in the accompanying drawings, in which:

Fig. 1 is a fragmentary side elevation of a belt embodying my invention.

Fig. 2 is a fragmentary plan or outside view thereof.

Fig. 3 is a fragmentary side elevation with the joint of coupling flexed.

Fig. 4 is a transverse section on line 4—4 of Figs. 1 and 2.

Fig. 5 is a perspective view of a coupling pin and shroud or thrust plates removed from a coupling, one of the thrust plates being shown in operative relation to the pin and the other in disassembled relation.

Figure 6:
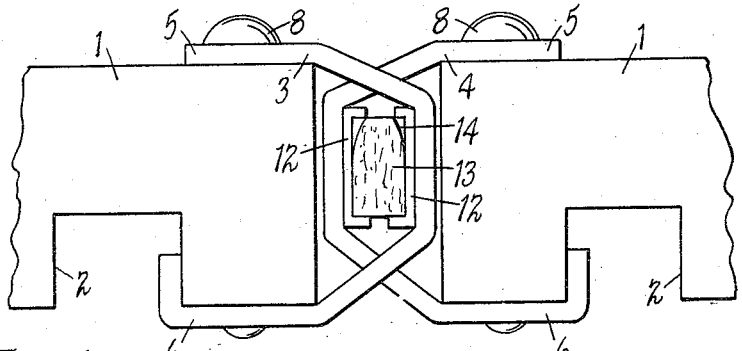
Fig. 6 is a fragmentary side elevation of a slightly modified embodiment of my invention.

In the embodiment of my invention illustrated, the belt 1 is of V-type or V-cross section, that is, it is inwardly tapered and has a plurality of transverse notches 2 on its inner edge.

My improved coupling comprises coupling members 3 and 4, each coupling member having attaching plates 5 and 6, the attaching plates 5 being preferably set into longitudinal slots 7 in the adjacent ends of the belt. The attaching screws or rivets are shown at 8.

The coupling members 3 and 4 are bail-like in shape, their end or bight portions 9 being preferably inwardly and downwardly inclined as shown in Fig. 1, these bight portions being straight. The upper arms 10 are preferably angled as shown and their lower arms are upwardly inclined.

The coupling pin 11 is preferably of resilient material such as a suitable rubber composition, and is preferably of such length that its ends, which are inclined, lie in the plane of the sides of the belt, the pin constituting a pulley-engaging or driving member.

I provide channel-shaped shrouds or thrust members 12 which embrace opposite sides of the pin and fit within the outer ends of the coupling members so as to move therewith; that is, there is no frictional movement of these members 12 on the coupling members as the joint is flexed, the pin yielding to permit this flexing as shown in Fig. 2. Further, there is no frictional movement of the plates on the pin other than would result in the flexing of the pin which fits within and is supported by the channels of the thrust plates.

It will be noted that the coupling pin is of rectangular cross section and that when the coupling members are in aligned relation as on a straight reach of the belt, that the shrouds 12 are supported in outwardly diverging relation and are out of contact with the upper portion of the pin. When the belt is flexed as by passing around a pulley, these shrouds rock or swing with the coupling members, their lower portions swinging away from the pin and their upper portions swinging into contact and compressing the pin as shown in Fig. 2 in which the belt sections are shown at an angle in order to illustrate this feature.

With this arrangement, the belt may be employed on relatively small pulleys without undue stress on the parts. The wear on the pin is minimized as there is no frictional or sliding relation between the parts.

Figure 7:
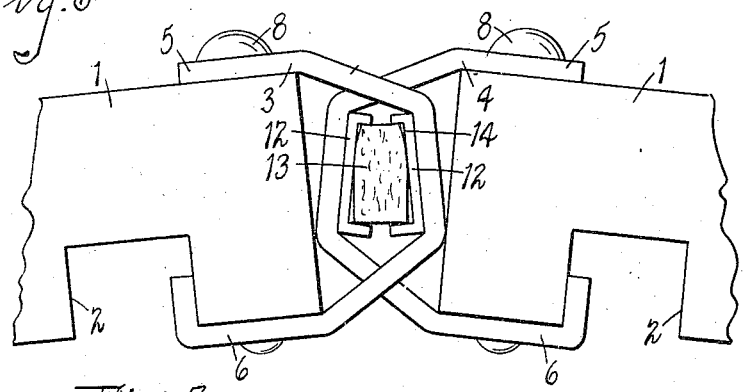
Fig. 7 is a fragmentary side elevation of the coupling of Fig. 6 flexed.
Figure 8:
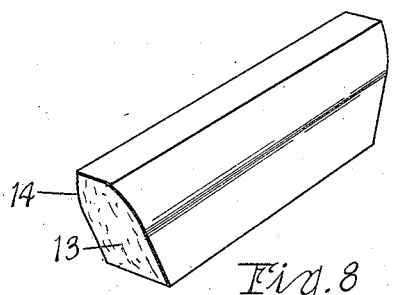
Fig. 8 is a perspective view of the coupling pin of the embodiment of Figs. 6 and 7.

In the modification shown in Figs. 6, 7 and 8, the shape of the coupling members is somewhat modified and shown as adapted to a pin 13 of leather or other material having little or no resilience as compared with the rubber or resilient pin of the embodiment previously described. This pin 13 has its outer edges 14 beveled, the bevels being preferably on curved lines as illustrated so that as the joint flexes the thrust plates rock on the pin, see Fig. 7. There is, however, in this embodiment substantially no friction on the pin as the thrust plates merely rock thereon, rather than slide or rotate as is common action of coupling members on the coupling pins which results not only in a very substantial amount of friction but the pins soon become worn.

My improved coupling is well adapted for embodiment in belts designed for heavy work, and also light belts or belts for light loads. The parts are comparatively economical and easily assembled. Further, there is a minimum of lost motion or looseness in the coupling particularly where the pins are of resilient material.

I have not attempted to illustrate or describe various modifications and adaptations of my improvements as it is believed that this disclosure will enable those skilled in the art to embody or adapt my improvements as may be desired.

Having thus described my invention, what I claim as new and desire to secure by Letters Patent, is:

1. The combination with a belt of tapered cross section, of bail-like coupling members disposed in alternating overlapping relation and having straight cross portions disposed in an inwardly inclined relation, a pin of resilient material and of rectangular cross section disposed through said coupling members, and channel-shaped shrouds embracing opposite sides of said pin, said shrouds fitting within the outer ends of said coupling members and movable therewith, the ends of said pin lying in the planes of the sides of the belt so that the pin consitutes a driving element of the belt.

2. The combination with a belt of tapered cross section, of bail-like coupling members disposed in overlapping alternating relation and having straight cross portions, a pin of rectangular cross section disposed through said coupling members, and channel-shaped shrouds embracing opposite sides of said pin, said shrouds fitting within the outer ends of said coupling members and movable therewith, the ends of said pin lying in the planes of the sides of the belt so that the pin constitutes a driving element of the belt.

3. The combination with a belt of tapered cross section, of bail-like coupling members disposed in overlapping alternating relation and having inwardly inclined cross portions, a pin of rectangular cross section disposed through said coupling members, and thrust plates engaging opposite sides of said pin, said plates fitting within the outer ends of said coupling members and movable therewith, the ends of said pin lying in the planes of the sides of the belt so that the pin constitutes a driving element of the belt.

4. In a belt coupling the combination of coacting bail-like overlapping coupling members having straight cross portions, a coupling pin of resilient material and rectangular cross section, and channeled thrust plates disposed on opposite sides of said pin and in supporting engagement with the outer ends of the coupling members so as to move therewith, said pin yielding to permit relative angular movement of said coupling members.

5. In a belt coupling, the combination of coacting bail-like overlapping coupling members having straight cross portions, a coupling pin of rectangular cross section, and thrust plates disposed on opposite sides of said pin and in supporting engagement with the outer ends of the coupling members so as to move therewith.

6. In a belt coupling, the combination of coacting bail-like overlapping coupling members, a coupling pin of resilient material and non-circular cross section, and thrust plates disposed on opposite sides of said pin and in supporting engagement with the outer ends of the coupling members so as to move therewith, said pin yielding to permit relative angular movement of said coupling members.

7. In a belt coupling, the combination of coacting bail-like overlapping coupling members, a coupling pin of non-circular cross section, and thrust plates disposed on opposite sides of said pin and in supporting engagement with the outer ends of the coupling members so as to move therewith.

8. In a belt coupling, the combination of coacting bail-like overlapping coupling members having straight inwardly inclined cross portions, a coupling pin of rectangular cross section, disposed in said coupling members and channel-shaped thrust plates embracing opposite sides of said pin, longitudinal edges of said pin being beveled.

9. In a belt coupling, the combination of coacting bail-like overlapping coupling members having outwardly converging arm portions and straight cross portions disposed in said coupling members, a coupling pin of non-circular cross section, and thrust plates engaging opposite sides of said pin.

10. A belt coupling comprising coacting bail-like overlapping coupling members having straight inwardly inclined cross portions, a non-metallic pin, and thrust plates arranged in the outer ends of said coupling members to engage opposite sides of said pin.

11. A belt coupling comprising coacting bail-like overlapping coupling members, a non-metallic pin, and thrust plates arranged in the outer ends of said coupling members to engage opposite sides of said pin.

12. In a belt coupling, the combination of coacting bail-like overlapping coupling members, a coupling pin of rectangular cross section disposed in said coupling members, and channel-shaped thrust plates embracing opposite sides of said pin, the edges of said pin being beveled.

13. In a belt coupling, the combination of coacting bail-like overlapping coupling members, a coupling pin of rectangular cross section disposed in said coupling members, and thrust plates engaging opposite sides of said pin.

14. A belt coupling comprising coacting bail-like overlapping coupling members, a non-circular pin of resilient material, and thrust plates arranged in the outer ends of said coupling members to engage opposite sides of said pin.

In witness whereof I have hereunto set my hand.

JAMES K. DIAMOND.